US008631452B2

(12) United States Patent
Xu et al.

(10) Patent No.: US 8,631,452 B2
(45) Date of Patent: Jan. 14, 2014

(54) CHANNEL SWITCHING PROCESSING METHOD, SYSTEM, AND RELATED DEVICES

(75) Inventors: Yangpo Xu, Shenzhen (CN); Xin Liu, Shenzhen (CN); Peiyun Di, Shenzhen (CN); Zixuan Zou, Shenzhen (CN); Guanghai Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 13/373,916

(22) Filed: Dec. 5, 2011

(65) Prior Publication Data

US 2012/0084826 A1    Apr. 5, 2012

Related U.S. Application Data

(63) Continuation of application No. PCT/CN2010/073568, filed on Jun. 4, 2010.

(30) Foreign Application Priority Data

Jun. 5, 2009 (CN) .......................... 2009 1 0146974
Sep. 18, 2009 (CN) .......................... 2009 1 0171987

(51) Int. Cl.
*H04N 7/173* (2011.01)
*H04N 7/12* (2006.01)
*H04N 11/02* (2006.01)
*H04N 11/04* (2006.01)

(52) U.S. Cl.
USPC ....... 725/109; 725/118; 725/131; 375/240.27

(58) Field of Classification Search
None
See application file for complete search history.

(56) References Cited

U.S. PATENT DOCUMENTS

| | | | |
|---|---|---|---|
| 2005/0081244 A1* | 4/2005 | Barrett et al. | 725/97 |
| 2006/0200561 A1 | 9/2006 | Tsuhara et al. | |
| 2006/0242664 A1 | 10/2006 | Kikkawa et al. | |
| 2006/0262651 A1 | 11/2006 | Cooper et al. | |

(Continued)

FOREIGN PATENT DOCUMENTS

| | | |
|---|---|---|
| CN | 1859270 A | 11/2006 |
| CN | 1859272 A | 11/2006 |

(Continued)

OTHER PUBLICATIONS

Chinese Patent No. 101909196, issued on Apr. 17, 2013, granted in corresponding Chinese Patent Application No. 200910171987.2, 1 page.

(Continued)

*Primary Examiner* — Mark D Featherstone
*Assistant Examiner* — Akshay Doshi
(74) *Attorney, Agent, or Firm* — Brinks Gilson & Lione

(57) ABSTRACT

A channel switching processing method, system, and related devices are provided. The method includes: receiving, by a switching server, a channel switching request sent by a receiving end; and when the switching server determines that current switching resource information does not meet a switching condition according to the channel switching request, performing, by the switching server, an exception handling procedure, and sending channel switching instruction information to the receiving end, in which the channel switching instruction information is configured to instruct the receiving end to perform a channel switching operation corresponding to the channel switching instruction information. A channel switching processing system and related devices are also provided. Therefore, the channel switching efficiency may be effectively improved.

22 Claims, 7 Drawing Sheets

(56) References Cited

U.S. PATENT DOCUMENTS

| | | | |
|---|---|---|---|
| 2007/0107024 A1* | 5/2007 | Versteeg et al. | 725/95 |
| 2007/0107026 A1 | 5/2007 | Sherer et al. | |
| 2007/0204320 A1 | 8/2007 | Wu et al. | |
| 2007/0280298 A1* | 12/2007 | Hearn et al. | 370/498 |
| 2008/0013563 A1 | 1/2008 | Sasaki et al. | |
| 2008/0168507 A1 | 7/2008 | Teramoto et al. | |
| 2008/0276292 A1 | 11/2008 | Han | |
| 2008/0282301 A1* | 11/2008 | Liu et al. | 725/100 |
| 2009/0116379 A1* | 5/2009 | Rahman | 370/229 |
| 2010/0118938 A1* | 5/2010 | Fuchs et al. | 375/240.12 |
| 2011/0061084 A1* | 3/2011 | Bejerano et al. | 725/109 |
| 2011/0302604 A1* | 12/2011 | Hal n et al. | 725/38 |

FOREIGN PATENT DOCUMENTS

| | | |
|---|---|---|
| CN | 1984324 A | 6/2007 |
| CN | 101072328 A | 11/2007 |
| CN | 101137043 A | 3/2008 |
| CN | 101155298 A | 4/2008 |
| CN | 101267538 A | 9/2008 |
| CN | 101374065 A | 2/2009 |
| EP | 1 427 132 A1 | 6/2004 |
| EP | 1612685 A1 | 1/2006 |
| EP | 1775953 A1 | 4/2007 |
| EP | 1 892 881 A1 | 2/2008 |
| EP | 2 071 846 A1 | 6/2009 |
| JP | 2004312412 A | 11/2004 |
| JP | 2005124193 A | 5/2005 |
| JP | 2006246395 A | 9/2006 |
| JP | 2008022217 A | 1/2008 |
| JP | 2008160316 A | 7/2008 |
| KR | 20050035071 A | 4/2005 |
| RU | 2008128510 A | 1/2010 |
| RU | 2398363 C2 | 8/2010 |
| WO | WO 2008/110122 A1 | 9/2008 |
| WO | WO 2008/125054 A1 | 10/2008 |

OTHER PUBLICATIONS

Song, Jongtae "Overview of ITU-NGN QoS Control" IEEE Communications Magazine. Sep. 2007:116-123.
Anderson, Thomas W. et al. "The Emerging Resource and Admission Control Function Standards and Their Application of Triple-Play Services" Bell Labs Technical Journal. Wiley InterScience. Mar. 21, 2007:5-21.
Fuchs, Harald et al. "Optimizing Channel Change Time in IPTV Applications" IEEE International Symposium, Piscataway, New Jersey. Mar. 31, 2008:1-8.
Ooghe, Sven "Resource Admission Control in Access Network" Bell Labs Technical Journal. Wiley InterScience. Mar. 21, 2008:1-8.
Extended European Search Report issued in corresponding European Patent Application No. 10782988.9; mailed Jun. 10, 2013.
Patent Examination Report issued in corresponding Australian Patent Application No. 2010256136; mailed May 31, 2013.
Office Action issued in corresponding Chinese Patent Application No. 200910171987.2, mailed Aug. 27, 2012.
Office Action issued in corresponding Korean Patent Application No. 10-2011-7030672, mailed Mar. 25, 2013.
Office Action issued in corresponding Japanese Patent Application No. 2012-513465, mailed May 28, 2013, 7 pages.
Office Action issued in corresponding Russian Patent Application No. 2011151995, mailed Mar. 1, 2013.
Office Action issued in corresponding Chinese Patent Application No. 200910171987.2, mailed Nov. 24, 2011.
Written Opinion of the International Searching Authority issued in corresponding PCT Patent Application No. PCT/CN2010/073568, mailed Sep. 23, 2010.
International Search Report issued in corresponding PCT Patent Application No. PCT/CN2010/073568, mailed Sep. 23, 2010.
Van Caenegem et al., "Maintaining Video Quality and Optimizing Video Delivery Over the Bandwidth Constrained DSL Last Mile Through Intelligent Packet Drop" Bell Labs Technical Journal 13(1), 2008.
Versteeg et al., "Unicast-Based Rapid Acquisition of Multicast RTP Sessions" AVT Internet Draft, Apr. 16, 2009.
Versteeg et al., "Unicast-Based Rapid Acquisition of Multicast RTP Sessions" AVT Internet Draft, Apr. 16, 2009. Txt version.

* cited by examiner

CHANNEL SWITCHING PROCESSING METHOD, SYSTEM, AND RELATED DEVICES

CROSS-REFERENCE TO RELATED APPLICATIONS

This application is a continuation of International Application No. PCT/CN2010/073568, filed on Jun. 4, 2010, which claims priority to Chinese Patent Application No. 200910146974.X, filed with the Chinese Patent Office on Jun. 5, 2009, and to Chinese Patent Application No. 200910171987.2, filed with the Chinese Patent Office on Sep. 18, 2009, which are incorporated herein by reference in their entireties.

FIELD OF THE INVENTION

The present invention relates to the field of communications technologies, and in particular, to a channel switching processing method, system, and related devices.

BACKGROUND OF THE INVENTION

A Quality of Experience (QoE) parameter is a parameter for evaluating a Quality of Service (QoS) in terms of experience of a common user. In an Internet Protocol Television (IPTV) service, channel switching time is an important index that affects the QoE parameter.

The channel switching time refers to the duration of time from a moment that a user sends a channel switching instruction to a moment that the user views a new channel. After the user sends the channel switching instruction to a Set-Top Box (STB), the STB sends a channel switching request to a switching server that provides a channel switching service. After receiving the request of the STB, the switching server responds to the request, and if it is determined to accept the request, provides the user with a fast channel switching service in a unicast or multicast manner (that is, sends a temporary data stream to the user, in which the data stream is obtained by copying an original multicast stream). After the user accesses a switching stream for a certain period of time, a multicast server provides the user with a service of the channel (that is, the multicast server sends the original multicast stream to the user).

During the fast channel switching, switching resource information such as network bandwidth, a server load, switching time of a receiving end, and channel buffer content may change at any time, and such a change may disable the normal fast channel switching service. For example, when the network available bandwidth is reduced or the server load is larger than a preset threshold value, the switching server may directly reject the request after receiving the channel switching request sent by the STB.

In a solution of the prior art, when detecting that the switching resource information does not meet a switching condition, the switching server may reject the channel switching request sent by the STB, but only feed back a rejection message to the STB. The STB may only acquire that the channel switching request is rejected after obtaining the rejection message. Therefore, the STB may not determine how to process after the channel switching request is rejected.

Because the STB may not acquire a specific rejection reason after receiving the rejection message sent by the switching server, the STB may not continue the corresponding processing after the channel switching request is rejected, which therefore affects the channel switching efficiency.

Secondly, in the solution of the prior art, once detecting that the switching resource information does not meet the switching condition (that is, failing to send a data stream obtained by copying an original multicast stream to the STB), the switching server may directly reject the channel switching request of the STB, so that available resources in the switching server may not be fully used, which therefore affects the channel switching efficiency.

SUMMARY OF THE INVENTION

The present invention is directed to a channel switching processing method, system, and related devices, which is capable of improving the channel switching efficiency.

An embodiment of the present invention provides a channel switching processing method, where the method includes: receiving, by a switching server, a channel switching request sent by a receiving end; and performing, by the switching server, when determining that current switching resource information does not meet a switching condition according to the channel switching request, an exception handling procedure, and sending channel switching instruction information to the receiving end, in which the channel switching instruction information is configured to instruct the receiving end to perform a channel switching operation corresponding to the channel switching instruction information.

An embodiment of the present invention provides a channel switching processing method, where the method includes: sending, by a receiving end, a channel switching request to a switching server; receiving, by the receiving end, channel switching instruction information sent by the switching server when the switching server determines that current switching resource information does not meet a switching condition according to the channel switching request; and performing, by the receiving end, a channel switching operation corresponding to the channel switching instruction information according to the channel switching instruction information.

An embodiment of the present invention provides a channel switching processing method, where the method includes: receiving, by a switching server, a channel switching request sent by a receiving end; obtaining, by the switching server, a moment that a next random access point appears from a data stream according to the channel switching request, in which the data stream is obtained by copying an original multicast stream; and when the switching server determines that a time length from a moment that the channel switching request is received to the moment that the next random access point appears meets a preset condition, sending, by the switching server, channel switching instruction information to the receiving end, in which the channel switching instruction information includes description information and processing information; the description information includes at least one of a target multicast group address and the moment that the next random access point appears; and the processing information is configured to instruct the receiving end to immediately join a target multicast group according to the target multicast group address, or to join the target multicast group according to the target multicast group address before the moment that the next random access point appears.

An embodiment of the present invention provides a channel switching processing system, where the system includes: a switching server and a receiving end. The switching server is configured to receive a channel switching request sent by the receiving end, and perform an exception handling procedure when determining that current switching resource information does not meet a switching condition according to the channel switching request, and send channel switching instruction information to the receiving end. The receiving end is configured to send the channel switching request to the switching server, receive the channel switching instruction information sent by the switching server, and perform a channel switching operation corresponding to the channel switching instruction information according to the channel switching instruction information.

An embodiment of the present invention provides a switching server, where the switching server includes: a receiving unit, configured to receive a channel switching request sent by a receiving end; a resource analyzing unit, configured to determine whether current switching resource information meets a switching condition according to the channel switching request; and an exception handling unit, configured to, perform an exception handling procedure when the resource analyzing unit determines that the current switching resource information does not meet the switching condition, and send channel switching instruction information to the receiving end, in which the channel switching instruction information is configured to instruct the receiving end to perform a channel switching operation corresponding to the channel switching instruction information.

An embodiment of the present invention provides a receiving end, where the receiving end includes: a request sending unit, configured to send a channel switching request to a switching server; an instruction receiving unit, configured to receive channel switching instruction information sent by the switching server when the switching server determines that current switching resource information does not meet a switching condition according to the channel switching request; and a processing unit, configured to perform a channel switching operation corresponding to the channel switching instruction information according to the channel switching instruction information.

It may be seen from the above technical solutions that, in the embodiments of the present invention, when determining that the current switching resource information does not meet the switching condition, the switching server may perform the exception handling procedure and send the channel switching instruction information for indicating the receiving end to perform a corresponding operation to the receiving end. As a result, when failing to provide a normal fast channel switching service, the switching server may send the specific channel switching instruction information to the receiving end, so as to instruct the receiving end about which kind of corresponding processing to be performed, while may not necessarily directly reject the channel switching request, so as to enable the receiving end to perform a reasonable operation and effectively use available resources of the switching server, which therefore improves the channel switching efficiency.

An embodiment of the present invention provides a channel switching method, where the method includes: receiving, by a switching server, a channel switching request from a receiving end; and sending, by the switching server, channel switching instruction information to the receiving end in response to the channel switching request, and sending tailored data from a data stream to the receiving end, in which the channel switching instruction information includes description information of the tailored data sent by the switching server and/or processing information for sending the tailored data from the data stream, so as to enable the receiving end to identify the tailored data, and to perform an operation corresponding to the channel switching instruction information according to the channel switching instruction information.

An embodiment of the present invention provides a channel switching method, where the method includes: sending, by a receiving end, a channel switching request to a switching server; receiving, by the receiving end, channel switching instruction information sent by the switching server in response to the channel switching request and tailored data from a data stream sent by the switching server; and identifying, by the receiving end, the tailored data, and performing an operation corresponding to the channel switching instruction information according to the channel switching instruction information.

It may be seen from the above technical solutions that, in the embodiments of the present invention, furthermore, no matter whether the current switching resource information of the switching server meets the switching condition, the switching server may not directly reject the channel switching request, and may send the channel switching instruction information for indicating the receiving end to perform the corresponding operation and the tailored data from the data stream to the receiving end, so as to enable the receiving end to perform a reasonable operation and effectively use available resources of the switching server, which therefore improves the channel switching efficiency.

DETAILED DESCRIPTION OF THE EMBODIMENTS

The present invention provides a channel switching processing method, system, and related devices, so as to improve the channel switching efficiency.

Figure 1:
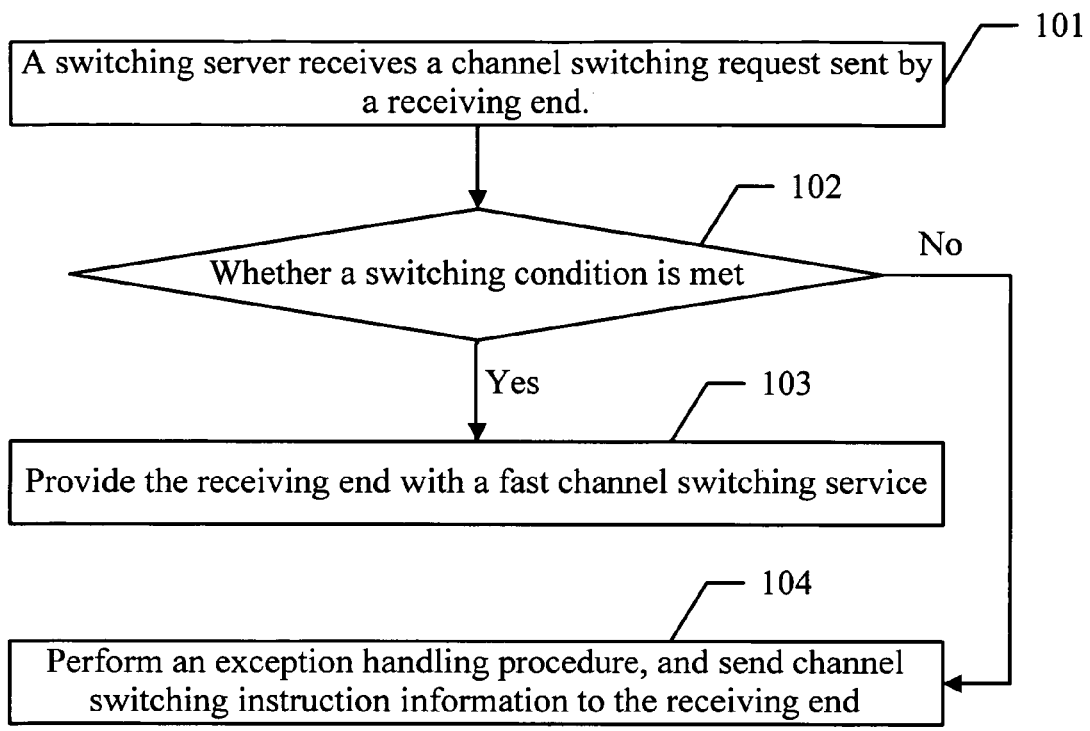
FIG. 1 is a flow chart of an embodiment of a channel switching processing method according to the present invention.

Referring to FIG. 1, an embodiment of a channel switching processing method is provided, which includes the following steps:

101: A switching server receives a channel switching request sent by a receiving end.

When watching a program and requesting channel switching, a user may initiate a channel switching request to the switching server through an STB.

In this embodiment, the channel switching means that a data stream received by the receiving end switches among different data sessions, in which the data sessions may be multicast sessions or unicast sessions. The channel switching hereinafter is, for example, the switching of the data stream received by the receiving end among different multicast sessions.

102: The switching server determines whether current switching resource information meets a switching condition, and if the current switching resource information meets the switching condition, perform step 103; if the current switching resource information does not meet the switching condition, perform step 104.

The switching resource information in this embodiment may include network bandwidth information, server load information, buffer information of receiving end, channel buffer information, and other information. It is understandable that, in an actual application, the switching resource information may also be other types of information that may represent switching resources, which is not specifically limited herein.

103: Provide the receiving end with a fast channel switching service.

When determining that the switching resource information meets the switching condition, the switching server provides the receiving end with the fast channel switching service, that is, sends a data stream obtained by copying an original multicast stream to the receiving end.

104: Perform an exception handling procedure, and send channel switching instruction information to the receiving end.

When determining that the switching resource information does not meet the switching condition, the switching server performs the exception handling procedure and sends the channel switching instruction information to the receiving end, in which the channel switching instruction information is configured to instruct the receiving end to perform an operation corresponding to the channel switching instruction information.

In this embodiment, when determining that the current switching resource information does not meet the switching condition, the switching server may perform the exception handling procedure and send the channel switching instruction information for indicating the receiving end to perform the corresponding operation to the receiving end. As a result, when failing to provide a normal fast channel switching service, the switching server may send the specific channel switching instruction information to the receiving end, so as to instruct the receiving end about which kind of corresponding processing to be performed, while may not necessarily directly reject the channel switching request, so as to enable the receiving end to perform a reasonable operation and effectively use available resources of the switching server, which therefore improves the channel switching efficiency.

For a better understanding, the channel switching processing method in the embodiment of the present invention is described with reference to the exception handling procedure specifically performed by the switching server.

I. The Switching Server Tailors the Data Stream.

Figure 2:
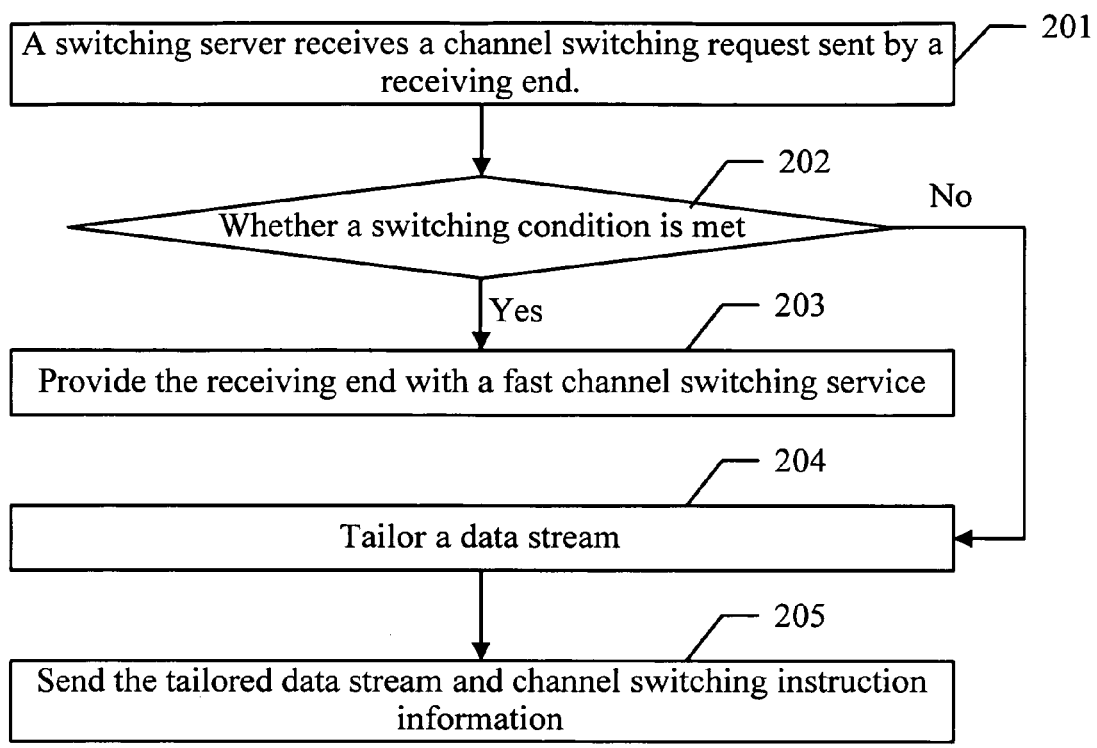
FIG. 2 is a flow chart of another embodiment of a channel switching processing method according to the present invention.

Referring to FIG. 2, another embodiment of a channel switching processing method is provided, which includes the following steps:

201: A switching server receives a channel switching request sent by a receiving end.

When watching a program and requesting to switch to another channel, a user may initiate a channel switching request to the switching server through an STB.

In this embodiment, the channel switching request sent by the receiving end may carry an identifier of a target channel requested to switch to.

202: The switching server determines whether current switching resource information meets a switching condition according to the channel switching request, and if the current switching resource information meets the switching condition, perform step 203; if the current switching resource information does not meet the switching condition, perform step 204.

The switching resource information in this embodiment may include network bandwidth information, server load information, buffer information of receiving end, channel buffer information, and other information. It is understandable that, in an actual application, the switching resource information may also be other types of information that may represent switching resources, which is not specifically limited herein.

After receiving the channel switching request from the receiving end, the switching server may acquire an identifier of a target channel, and acquire various switching resource information required for switching to the target channel according to a corresponding relationship between a locally stored channel identifier and a resource demand. Then, the switching server may obtain currently corresponding switching resource information to determine whether the switching resource information meets the switching condition. For example, if at least 2 M idle bandwidth in the network is required for switching to the target channel, the switching server may detect idle bandwidth of the current network to determine whether the bandwidth meets the switching condition.

Specifically, in this embodiment, if at least one of the following conditions is met, the switching server determines that the current switching resource information does not meet the switching condition.

The switching server determines that available bandwidth is smaller than a preset bandwidth threshold value according to the network bandwidth information;

The switching server determines that a server load is larger than a preset load threshold value according to the server load information;

The switching server determines that the data stream makes a receiving end buffer larger than a preset buffer maximum threshold according to the buffer information of receiving end;

The switching server determines that the data stream makes the receiving end buffer smaller than a preset buffer minimum threshold according to the buffer information of receiving end; and The switching server determines that the data stream makes a receiving end playback time-shift larger than a preset threshold value according to the channel buffer information.

The data stream in this embodiment is obtained by completely copying an original multicast stream, or is obtained by tailoring the original multicast stream.

It should be noted that, if another type of switching resource information is adopted in an actual application, similar determination may also be performed, and a specific determination process is not limited herein.

203: Provide the receiving end with a fast channel switching service.

When determining that the switching resource information meets the switching condition, the switching server provides the receiving end with the fast channel switching service, that is, sends a data stream obtained by copying the original multicast stream to the receiving end.

204: Tailor the data stream to obtain a tailored data stream.

When the switching server determines that the switching resource information does not meet the switching condition, in order to reduce resources occupied by the data stream, the data stream may be tailored, and the specific tailoring may include reducing, transcoding, and/or deleting. The data stream may be reduced to obtain key information or a reference frame in the data stream, and specific implementation may include the following steps:

The key information or reference frame in the data stream is obtained.

The key information or reference frame is assembled as the tailored data stream.

The key information is required for the receiving end to process data, which may be different for different types of data streams, and may be key data in the data stream or data information in the data stream. The key information includes channel program dedicated information, video sequence parameter set information, video image parameter set information, audio decoding parameter information, and/or program specific information (PSI) in a transport stream. It is understandable that, if another data stream is adopted in an actual application, key information of the data stream may also be extracted correspondingly, and the specific key information and extracting process are not limited herein.

The deleting the data stream may include deleting data that has a small impact on a video sequence decoding quality from the original multicast stream, in which the data may include B-frame data or video enhancement-layer data. In different application scenarios, the data that has a small impact on the video sequence decoding quality may be other unnecessary data in addition to the B-frame data or video enhancement-layer data.

The transcoding the data stream may include recoding the original multicast stream, which therefore reduces a frame rate, or reduces resolution or increases a Group Of Pictures (GOP) length in different scenarios.

It should be noted that, the tailoring means in this embodiment may be different in combination with different data stream properties. Therefore, specific tailoring means is not further limited in this embodiment.

205: Send the tailored data stream and channel switching instruction information.

After tailoring the data stream to obtain the tailored data stream, the switching server may send the tailored data stream to the receiving end, and send first channel switching instruction information to the receiving end at the same time, in which the first channel switching instruction information includes first description information and/or first processing information.

The first description information includes at least one of a destination address of the tailored data stream, tailoring information of the tailored data stream, and server exception information.

The first processing information is configured to instruct the receiving end to ignore lost content in the received data stream, and/or cancel data error correction, and/or update playback delay, and/or enable adaptive playback.

The data error correction in this embodiment includes Backward Error Correction (BEC) (retransmission) and/or Forward Error Correction (FEC).

In this embodiment, after receiving the first channel switching instruction information, the receiving end may acquire, according to the first description information therein, that a data stream to be received is the tailored data stream. Then, the lost content in the tailored data stream may be ignored according to the first processing information, including a GAP between the tailored data stream and a multicast stream of a target multicast group and a packet loss in the tailored data stream. Meanwhile, the data error correction may be cancelled. In addition, the receiving end may also perform other operations. For example, because the tailored data stream occupies small bandwidth and has a relatively high transmission speed, the playback delay may be updated. Moreover, because the tailored data stream has a relatively low quality, in order to improve the QoE, the play speed may be raised to quickly finish playing the content of the tailored data stream.

The server exception information in this embodiment may be current switching resource information or information for indicating that the current switching has certain problems, for example, the available bandwidth is insufficient or the server load is too large. The server exception information described in the following several embodiments has the same meaning as the server exception information in this embodiment.

It should be noted that, the receiving end may also perform operations of other types, and specific operations are determined according to content of the first channel switching instruction information, which are not limited herein.

This embodiment describes a solution that the switching server determines the switching resource information as soon as the switching server receives the channel switching request sent by the receiving end. It is understandable that, the switching resource information may change abruptly in an actual application, so that the switching server may continue to perform determination on the switching resource information after determining that the switching resource information meets the switching condition and performing Step 203, and once determining that the switching resource information does not meet the switching condition, the switching server may tailor a data stream that is not transmitted, and transmit the tailored data stream subsequently.

In this embodiment, step 204 may be implemented before step 202. In this case, step 205 is performed if switching resources do not meet the switching condition.

In this embodiment, when determining that the switching resource information does not meet the switching condition, the switching server may tailor the data stream to reduce the resources occupied by the data stream, send the tailored data stream to the receiving end, and through the first channel switching instruction information, notify the receiving end of making preparation and performing corresponding processing for receiving the tailored data stream. As a result, the switching server may still send the data stream to the receiving end when the switching resource information does not meet the switching condition, rather than directly reject the channel switching request of the receiving end. As a result, available resources of the switching server may be effectively used, and the receiving end is enabled to perform a reasonable operation, which therefore improves the channel switching efficiency.

Another embodiment of a channel switching processing method is provided, which includes the following steps:

101': A switching server receives a channel switching request from a receiving end.

This step is the same as step 101, and the receiving end herein is the same as the receiving end in step 101. The receiving end may be a client, which may also initiate a channel switching request to the switching server through an STB.

102': The switching server sends channel switching instruction information to the receiving end in response to the channel switching request and sends tailored data from a data stream to the receiving end.

After receiving the channel switching request from the receiving end, the switching server sends the channel switching instruction information to the receiving end in response to the channel switching request. In addition to the channel switching instruction information, the tailored data from the data stream is also sent to the receiving end. In this embodiment, the data stream is an original multicast data stream, and the channel switching instruction information includes description information of the tailored data sent by the switching server and/or processing information for sending the tailored data from the data stream, so as to enable the receiving end to identify the tailored data, and to perform an operation corresponding to the channel switching instruction information according to the channel switching instruction information.

After the switching server receives the channel switching request, no matter whether the current switching resources meet the switching condition, the switching server may not reject the channel switching request, but rather send the channel switching instruction information and the tailored data stream to the receiving end, so as to enable the receiving end to perform a reasonable operation and effectively use available resources of the switching server, which therefore further improves the channel switching efficiency.

Figure 11:
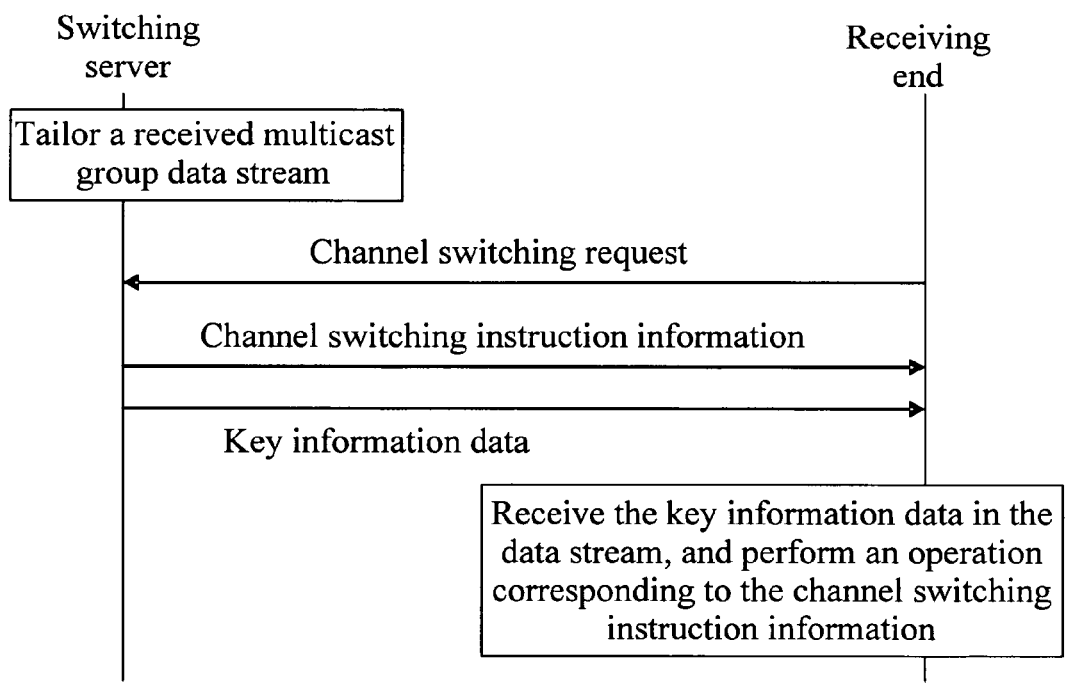
FIG. 11 is a schematic diagram of another embodiment of a channel switching processing method according to the present invention.

Referring to FIG. 11, another embodiment of a channel switching processing method is provided, which includes the following steps:

201': A switching server receives a channel switching request from a receiving end, which is the same as step 101.

202': Tailor a data stream to obtain tailored data.

The switching server tailors the received data stream, and the tailoring step is the same as step 204.

203': Send the tailored data from the data stream and channel switching instruction information, which is the same as step 205.

The channel switching instruction information is a response to the channel switching request of the receiving end. As a response message, the channel switching instruction information includes description information of the tailored data sent by the switching server and/or processing information for sending the tailored data from the data stream. The description information is configured to describe that the sent data stream is key information data, and/or the sent data stream is the tailored data, and/or address information of the key information data. The processing information is configured to instruct the receiving end to ignore lost content in the received data stream, cancel data error correction, update playback delay, enable adaptive playback, and/or join a multicast group.

The description information includes information for identifying the sent data stream as the key information data, the sent data stream as the tailored data, and/or a feature of the sent tailored data stream. The feature may be start location information of the key information data, such as a start serial number, end location information of the key information, such as an end serial number, start location information of the sent data stream, such as a start serial number, and/or end location information of the sent data stream, such as an end serial number. The processing information includes information for indicating the receiving end to ignore the lost data of the tailored data stream, not to retransmit the lost data between the sent data stream and the multicast stream, cancel the data error correction, update the playback delay, enable the adaptive playback, and/or join the multicast group.

In this embodiment, after receiving the channel switching instruction information, the receiving end may acquire, according to the description information therein, that a data stream to be received is the tailored data stream or the key information data of the data stream. Then, the lost content in the tailored data stream may be ignored according to the processing information, including a GAP between the tailored data stream and a multicast stream of a target multicast group and a packet loss in the tailored data stream. Meanwhile, the data error correction may be cancelled. In addition, the receiving end may also perform other operations. For example, because the tailored data stream occupies small bandwidth and has a relatively high transmission speed, the playback delay may be updated. Moreover, because the tailored data stream has a relatively low quality, in order to improve the QoE, the play speed may be raised to quickly finish playing the content of the tailored data stream.

It should be noted that, the receiving end may also perform operations of other types, for example, joining the multicast group, and a specific operation is determined according to the content of the channel switching instruction in formation, which is not limited herein.

It should be noted that, step 202' may be implemented before step 201'.

After the switching server receives the channel switching request, no matter whether the current switching resources meet the switching condition, the switching server may not reject the channel switching request, but rather send the channel switching instruction information and the tailored data stream to the receiving end, so as to enable the receiving end to perform a reasonable operation and effectively use available resources of the switching server, which therefore further improves the channel switching efficiency.

In the above two embodiments, the channel switching processing methods are described mainly in terms of the switching server. It is understandable that the operations of the receiving end in the embodiments of the present invention specifically include the following steps:

(1) The receiving end sends the channel switching request to the switching server.

(2) The receiving end receives the channel switching instruction information sent by the switching server in response to the channel switching request and the tailored data from the data stream sent by the switching server.

(3) The receiving end identifies the tailored data, and performs the channel switching operation corresponding to the channel switching instruction information according to the channel switching instruction information.

In this embodiment, the receiving end may acquire, according to the description information, that the received data stream is the tailored data stream, buffer or parse the tailored data including the key information data or media data, initialize the receiving end after obtaining the key information data, and try to decode and play the media data when a decoding condition is met after obtaining the media data.

In this embodiment, the operations specifically performed by the receiving end according to the channel switching instruction information are consistent with those in the foregoing embodiments, and are not described in detail herein again.

In this embodiment, the receiving end may perform a reasonable operation according to the channel switching instruction information after receiving the channel switching instruction information sent by the switching server, which therefore improves the channel switching efficiency.

In the aforementioned and the following embodiments, descriptions in addition to the step that the switching server determines whether the current switching resource information meets the switching condition are also applicable to the above two embodiments, and are not described in detail herein again.

It should be noted that, the tailoring of the data stream in the above embodiments may be performed by the switching server or by a third party. A logic or physical link exists between the third party and the switching server, and the switching server may send the data obtained by the third party tailoring the data stream to the receiving end.

II. The Switching Server Performs Delayed Transmission.

Figure 3:
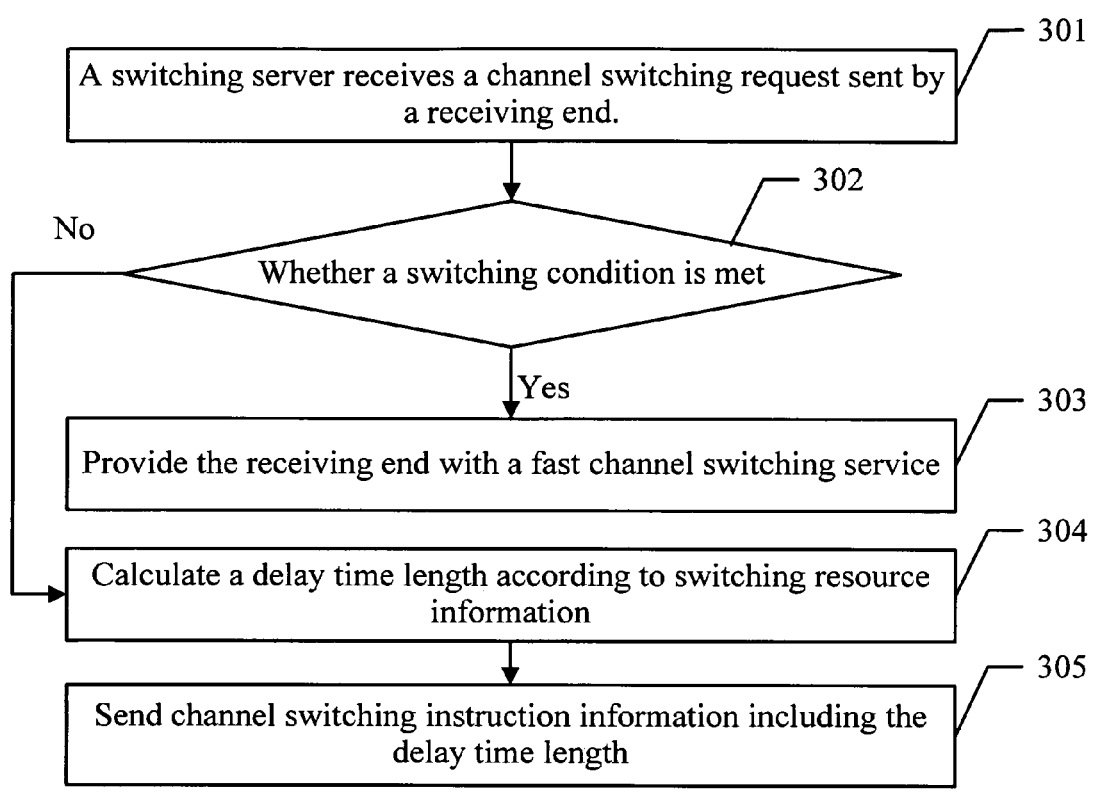
FIG. 3 is a flow chart of another embodiment of a channel switching processing method according to the present invention.

Referring to FIG. 3, another embodiment of a channel switching processing method is provided, which includes the following steps:

Steps 301-303 are the same as steps 201-203 in the embodiment shown in FIG. 2, and are not described in detail herein again.

304: Calculate a delay time length according to the switching resource information.

When the switching server determines that the switching resource information does not meet the switching condition, the delay time length may be calculated according to the switching resource information. For example, how long sufficient bandwidth is available to transmit a data stream may be calculated according to current network available bandwidth and a recent changing trend of network bandwidth. For example, an activity is held in the network between 19:00 and 19:20 every night, a large number of users may be online at that time, and a large quantity of network available resources may be occupied; and if a receiving end initiates a channel switching request at 19:15, the switching server determines that the current network available resources are insufficient, but it may be deduced according to the changing trend of the network bandwidth, that sufficient available bandwidth is available after a delay of 15 minutes (that is, the network is busy between 19:00 and 19:20, and the network is idle after 19:30), so the switching server calculates that the delay time length is 15 minutes.

It should be noted that, how the switching server calculates the delay time length is described above with just one example, while in an actual application, the switching server may also calculate the delay time length in other manners, and specific implementation is not limited herein.

305: Send channel switching instruction information including the delay time length.

After determining the delay time length, the switching server may send second channel switching instruction information to the receiving end, in which the second channel switching instruction in formation includes second description information and/or second processing information.

The second description information includes at least one of a data stream destination address, a delay time length, and server exception information.

The second processing information is configured to instruct the receiving end to start a timer to wait for the delay time length, and then to receive the data stream and/or update a receiving end state.

In this embodiment, after receiving the second channel switching instruction information, the receiving end may acquire, according to the second description information therein, that the data stream may be received only after the delay, so that the receiving end waits, modifies the receiving end state thereof as "Waiting for network data . . . , and the waiting time is about 15 minutes", and may display the receiving end state to a user.

It should be noted that, the timer may be started after the switching server determines the delay time length, and after the delay time length, the switching server may send the data stream or the tailored data stream to the receiving end.

In this embodiment, when the switching server determines that the switching resource information does not meet the switching condition, the delay time length may be calculated, and the delay time length may be fed back to the receiving end, so the receiving end may acquire when to start to receive the data, and may display the waiting time to the user. As a result, the situation may be prevented that the request is rejected as the receiving end repeatedly initiates the channel switching request when the data stream is not received for a long time, which therefore improves the channel switching efficiency.

III. The Switching Server Triggers the Receiving End to Directly Join the Target Multicast Group.

Figure 4:
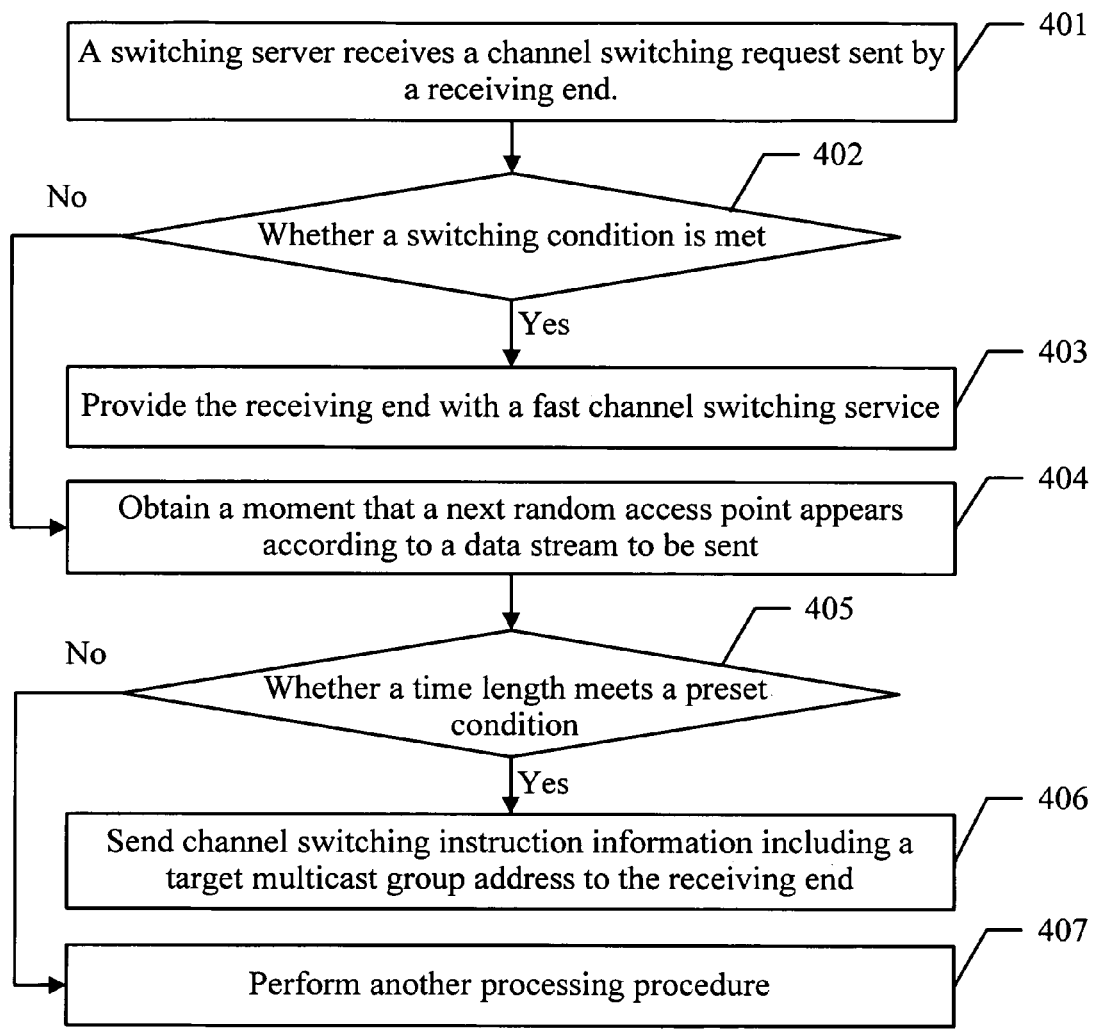
FIG. 4 is a flow chart of another embodiment of a channel switching processing method according to the present invention.

Referring to FIG. 4, another embodiment of a channel switching processing method is provided, which includes the following steps:

401: A switching server receives a channel switching request sent by a receiving end.

When watching a program and requesting to switch to another channel, a user may initiate a channel switching request to the switching server through an STB.

In this embodiment, the channel switching request sent by the receiving end may carry an identifier of a target channel requested to switch to.

402: The switching server determines whether current switching resource information meets a switching condition according to the channel switching request, and if the current switching resource information meets the switching condition, perform step 403; if the current switching resource information does not meet the switching condition, perform step 404.

The switching resource information in this embodiment may include network bandwidth information, server load information, buffer information of receiving end, channel buffer information, and other information. It is understandable that, in an actual application, the switching resource information may also be other types of information that can represent switching resources, which will not be specifically limited herein.

After receiving the channel switching request from the receiving end, the switching server may acquire the identifier of the target channel, and acquire various switching resource information required for switching to the target channel according to a corresponding relationship between a locally stored channel identifier and a resource demand. Then, the switching server may obtain currently corresponding switching resource information to determine whether the switching resource information meets the switching condition. For example, if at least 2 M idle bandwidth in the network is required for switching to the target channel, the switching server may detect idle bandwidth of the current network to determine whether the bandwidth meets the switching condition.

The manner of determining whether the switching resource information meets the switching condition in this embodiment is consistent with the determining manner shown in FIG. 2, and is not described in detail herein again.

403: Provide the receiving end with a fast channel switching service.

When determining that the switching resource information meets the switching condition, the switching server provides the receiving end with the fast channel switching service, that is, sends a data stream obtained by copying an original multicast stream to the receiving end.

404: Obtain a moment that a next random access point appears according to the data stream.

When determining that the switching resource information does not meet the switching condition, the switching server may determine the moment that the next random access point appears according to the data stream, that is, the moment that the receiving end may request to join a target multicast group.

405: Determine whether a time length from a moment that the channel switching request is received to a moment that a next random access point appears meets a preset condition, and if the time length meets the preset condition, perform step 406; if the time length does not meet the preset condition, perform step 407.

After determining the moment that the next random access point appears, the switching server may determine whether the time length from the moment that the channel switching request is received to the moment that the next random access point appears meets the preset condition.

In this embodiment, the preset condition may be met in the following specific cases.

When the time length from the moment that the channel switching request is received to the moment that the next random access point appears is larger than a first preset value and/or smaller than a second preset value, it is determined that the preset condition is met.

The first preset value may be a join delay of an Internet Group Management Protocol (IGMP), the second preset value may be a maximum time length that the receiving end may directly access a target multicast group, which is preset by the switching server, and the first preset value is smaller than the second preset value.

It should be noted that, in an actual application, the two determining conditions that, "the time length from the moment that the channel switching request is received to the moment that the next random access point appears is larger than the first preset value", and "the time length from the moment that the channel switching request is received to the moment that the next random access point appears is smaller than the second preset value" may be used individually or used in combination, which are not specifically limited herein.

406: Send channel switching instruction information including a target multicast group address to the receiving end.

If a time length from a moment that the channel switching request is received to a moment that a next random access point appears meets the preset condition, it indicates that the receiving end may request to join the target multicast group after a very short time, or may not miss data of the random access point. Then, the switching server sends third channel switching instruction information to the receiving end, in which the third channel switching instruction information includes third description information and/or third processing information.

The third description information includes at least one of a target multicast group address, a moment that the next random access point appears, and server exception information.

The third processing information is configured to instruct the receiving end to immediately join a target multicast group according to the target multicast group address, or to join the target multicast group according to the target multicast group address before the moment that the next random access point appears.

In this embodiment, after receiving the third channel switching instruction information, the receiving end may acquire, according to the third description information therein, that the receiving end may directly join the target multicast group to receive an original multicast stream without waiting for the data stream sent by the switching server. Therefore, the receiving end may immediately join the target multicast group according to the target multicast group address, or join the target multicast group according to the target multicast group address before the moment that the next random access point appears.

407: Perform another processing procedure.

If a time length from a moment that the channel switching request is received to a moment that a next random access point appears does not meet the preset condition, it indicates that the receiving end may request to join a target multicast group only after a quite long time, or may miss data of the random access point when the time length is smaller than a join delay of an IGMP. Therefore, the switching server may perform another processing procedure, which specifically may be, sending a tailored data stream to the receiving end, stopping the switching procedure, or carrying out other processing procedures, and which is not limited herein.

IV. The Switching Server Instructs the Receiving End to Perform Fast/Slow Playback.

Figure 5:
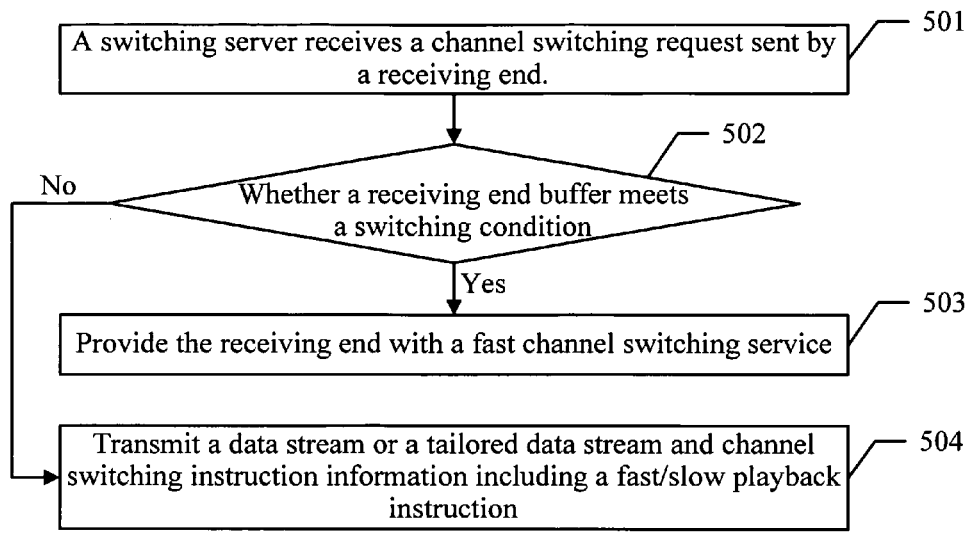
FIG. 5 is a flow chart of another embodiment of a channel switching processing method according to the present invention.

Referring to FIG. 5, another embodiment of a channel switching processing method is provided, which includes the following steps:

501: A switching server receives a channel switching request sent by a receiving end.

When watching a program and requesting to switch to another channel, a user may initiate the channel switching request to the switching server through an STB.

502: The switching server determines whether a receiving end buffer meets a switching condition, and if the receiving end buffer meets the switching condition, perform step 503; if the receiving end buffer does not meet the switching condition, perform step 504.

In this embodiment, the channel switching request sent by the receiving end may carry buffer requirement information, and the switching server may determine, according to the buffer requirement information, whether the receiving end buffer meets the switching condition if the switching server sends a data stream to the receiving end, and if the sending the data stream to the receiving end by the switching server may result in that the receiving end buffer is larger than a preset buffer maximum threshold or the receiving end buffer is smaller than a preset buffer minimum threshold, it is determined that the receiving end buffer does not meet the switching condition.

503: Provide the receiving end with a fast channel switching service.

When determining that the buffer information of receiving end meets the switching condition, the switching server provides the receiving end with the fast channel switching service, that is, sends a data stream obtained by copying an original multicast stream to the receiving end.

504: Transmit a data stream or a tailored data stream and channel switching instruction information to the receiving end.

In this embodiment, when determining that the buffer information of receiving end does not meet the switching condition, the switching server may send the data stream or the tailored data stream to the receiving end, and send fourth channel switching instruction information to the receiving end at the same time, in which the fourth channel switching instruction information includes fourth description information and/or fourth processing information.

If the sending the data stream by the switching server to the receiving end may result in the receiving end buffer is larger than the preset buffer maximum threshold, the fourth description information carries at least one of a fast playback instruction, a target multicast group address, tailored data stream tailoring information, media playback time, and server exception information.

The fourth processing information is configured to instruct the receiving end to perform fast playback according to the fast playback instruction, and/or join a target multicast group according to the target multicast group address, and/or ignore lost content in the tailored data stream, and/or cancel data error correction, and/or update playback delay, and/or play media in the data stream according to the media playback time.

If the sending the data stream by the switching server sends to the receiving end may result in that the receiving end buffer is smaller than the preset buffer minimum threshold, the fourth description information carries at least one of a slow playback instruction, a target multicast group address, tailored data stream tailoring information, media playback time, and server exception information.

The fourth processing information is configured to instruct the receiving end to perform slow playback according to the fast playback instruction, and/or join the target multicast group according to the target multicast group address, and/or ignore the lost content in the tailored data stream, and/or cancel data error correction, and/or update playback delay, and/or play the media in the data stream according to the media playback time.

The data error correction in this embodiment may be BEC and FEC.

In this embodiment, after receiving the fourth channel switching instruction information, the receiving end may acquire, according to the fourth description information therein, that it is necessary to perform fast playback or slow playback. If the receiving end buffer is larger than the preset buffer maximum threshold, the receiving end performs fast playback, so as to prevent accumulated data in the buffer from overflow. If the receiving end buffer is smaller than the preset buffer minimum threshold, the receiving end performs slow playback, so as to avoid failed playback because the receiving end buffer is null.

In addition, the receiving end may also join the target multicast group according to the target multicast group address, and/or ignore the lost content in the tailored data stream, and/or cancel the data error correction, and/or update the playback delay, in which the specific processing manner is similar to those in the above embodiments, and is not described in detail herein again.

It should be noted that, in this embodiment, when determining, according to the channel buffer information, that the data stream makes a receiving end playback time-shift larger than the preset threshold value, the switching server may also modify the media playback time, and send the modified media playback time to the receiving end to instruct the receiving end to play the media in the data stream according to the media playback time.

In this embodiment, when determining that the buffer information of receiving end does not meet the switching condition, the switching server may send the fast/slow playback instruction to the receiving end, so as to enable the receiving end to perform corresponding fast/slow playback according to the instruction, instead of repeatedly initiating the channel switching request to the switching server, which therefore improves the channel switching efficiency.

V. The Switching Server Forcedly Finishes a Switching Procedure.

Figure 6:
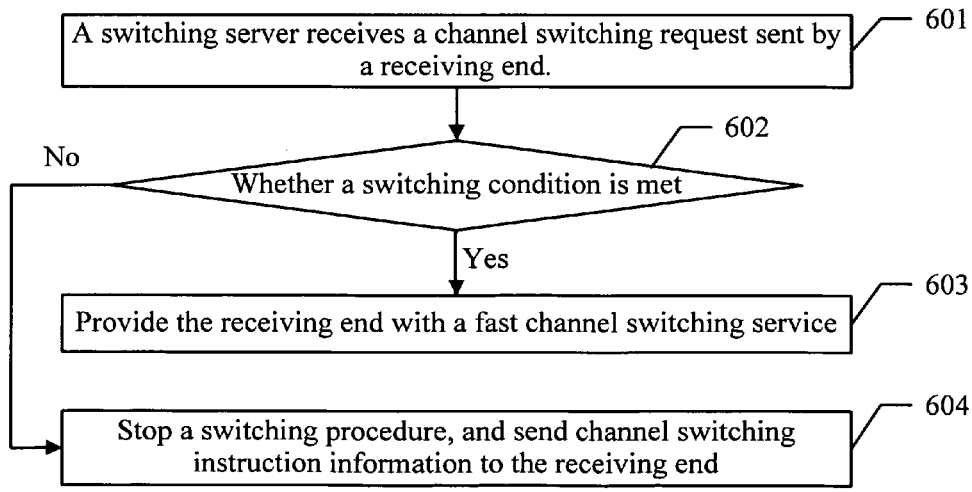
FIG. 6 is a flow chart of another embodiment of a channel switching processing method according to the present invention.

Referring to FIG. 6, another embodiment of a channel switching processing method is provided, which includes the following steps:

Steps 601-603 are the same as steps 201-203 in the embodiment shown in FIG. 2, and are not described in detail herein again.

604: Stop a switching procedure, and send channel switching instruction information to the receiving end.

When determining that the switching resource information does not meet the switching condition, the switching server stops the channel switching procedure, and sends fifth channel switching instruction information to the receiving end, in which the fifth channel switching instruction information includes fifth description information and/or fifth processing information.

The fifth description information includes at least one of a target multicast group address, a moment that a next random access point appears, a suspension time length, and server exception information.

The fifth processing information is configured to instruct the receiving end to immediately join a target multicast group according to the target multicast group address, or join the target multicast group according to the target multicast group address before the moment that the next random access point appears, and/or ignore a gap between a data stream and a multicast stream provided by the target multicast group, and/or initiate a new channel switching request to the switching server again after the suspension time length.

In this embodiment, after receiving the fifth channel switching instruction information, the receiving end may acquire, according to the fifth description information therein, that the switching server has stopped the switching procedure. Therefore, the receiving end may directly requests to join the target multicast group according to the target multicast group address included in the fifth description information, or initiate a new channel switching request to the switching server again after waiting for a period of time.

In this embodiment, when determining that the switching resource information does not meet the switching condition, the switching server may directly finish the switching procedure, and send the channel switching instruction information to the receiving end. As a result, the receiving end may perform a corresponding operation according to the channel switching instruction information fed back by the switching server, for example, joining the target multicast group, or initiating a new channel switching request to the switching server again after waiting for a period of time, instead of keeping waiting for a fast channel switching service provided by the switching server, which therefore improves the channel switching efficiency.

In the above embodiments, the channel switching processing methods are described mainly in terms of the switching server. It is understandable that the receiving end in the embodiments of the present invention may also perform corresponding operations according to the instruction of the switching server, which specifically include the following steps:

(1) The receiving end sends the channel switching request to the switching server.

(2) When the current switching resource information does not meet the switching server, the receiving end receives the channel switching instruction information fed back by the switching server.

In this embodiment, the channel switching instruction information fed back by the switching server may be any one of the first channel switching instruction information to the fifth channel switching instruction information in the above embodiments, and the specific content is not described in detail herein again.

(3) The receiving end performs corresponding processing according to the channel switching instruction information.

In this embodiment, the specific processing performed by the receiving end according to the channel switching instruction information is consistent with the descriptions in the above embodiments, and is not described in detail herein again.

In this embodiment, the receiving end may perform a reasonable operation according to the channel switching instruction information after receiving the channel switching instruction information sent by the switching server, which therefore improves the channel switching efficiency.

Another embodiment of a channel switching processing method is provided, which specifically includes the following steps:

(1) A switching server receives a channel switching request sent by a receiving end.

In this embodiment, the channel switching request sent by the receiving end may carry an identifier of a target channel.

(2) The switching server obtains a moment that a next random access point appears from a data stream according to the channel switching request, in which the data stream is obtained by copying an original multicast stream.

When receiving the channel switching request sent by the receiving end, the switching server may obtain the identifier of the target channel from the channel switching request, determine a target multicast group according to the identifier, obtain the original multicast stream from the target multicast group, and copy the original multicast stream to obtain the data stream.

Subsequently, the moment that the next random access point appears, that is, the moment that the receiving end may request to join the target multicast group, may be determined from the data stream.

(3) The switching server determines whether a time length from the moment that the channel switching request is received to the moment that the next random access point appears meets a preset condition, and if the time length meets the preset condition, the switching server sends channel switching instruction information to the receiving end, in which the channel switching instruction information includes description information and processing information. The description information includes a target multicast group address and the moment that the next random access point appears. The processing information is configured to instruct the receiving end to immediately join a target multicast group according to the target multicast group address, or to join the target multicast group according to the target multicast group address before the moment that the next random access point appears.

In this embodiment, after determining the moment that the next random access point appears, the switching server may determine whether the time length from the moment that the channel switching request is received to the moment that the next random access point appears meets a preset condition.

In this embodiment, the preset condition may be met in the following specific cases.

When the time length from the moment that the channel switching request is received to the moment that the next random access point appears is larger than a first preset value and/or smaller than a second preset value, it is determined that the preset condition is met.

The first preset value may be a join delay of an IGMP, the second preset value may be a maximum time length that the receiving end may directly access the target multicast group, which is preset by the switching server, and the first preset value is smaller than the second preset value.

It should be noted that, in an actual application, the two determining conditions that, "the time length from the moment that the channel switching request is received to the moment that the next random access point appears is larger than the first preset value", and "the time length from the moment that the channel switching request is received to the moment that the next random access point appears is smaller than the second preset value" may be used individually or used in combination, which are not limited herein.

In this embodiment, after receiving the channel switching request of the receiving end, the switching server may directly obtain the moment that the next random access point appears without considering the switching resource information. After determining that the time length from the moment that the channel switching request is received to the moment that the next random access point appears meets the preset condition, the switching server may send the channel switching instruction information including the target multicast group address to the receiving end, to instruct the receiving end to join the target multicast group according to the target multicast group address. Therefore, the receiving end does not need to wait the switching server to send the data stream, and may directly receive the original multicast stream from the target multicast group, which therefore improves the channel switching efficiency.

Figure 7:
FIG. 7 is a schematic diagram of an embodiment of a channel switching processing system according to the present invention.

Referring to FIG. 7, an embodiment of a channel switching processing system is provided, which includes a switching server 701 and a receiving end 702.

The switching server 701 is configured to receive a channel switching request sent by the receiving end 702, and when determining that current switching resource information does not meet a switching condition, perform an exception handling procedure and send channel switching instruction information to the receiving end 702.

The receiving end 702 is configured to send the channel switching request to the switching server 701, receive the channel switching instruction information sent by the switching server 701, and perform a channel switching operation corresponding to the channel switching instruction information according to the channel switching instruction information.

For a better understanding, the channel switching processing system of this embodiment is described below in an application scenario.

When watching a program and requesting to switch to another channel, a user may initiate a channel switching request to the switching server 701 through an STB.

The switching server 701 determines whether the current switching resource information meets the switching condition, and if the current switching resource information meets the switching condition, the switching server 701 provides the receiving end 702 with a fast channel switching service, that is, sends a data stream obtained by copying an original multicast stream to the receiving end.

When determining that the switching resource information does not meet the switching condition, the switching server 701 performs an exception handling procedure and sends the channel switching instruction information to the receiving end 702, in which the channel switching instruction information is configured to instruct the receiving end to perform an operation corresponding to the channel switching instruction information.

In this embodiment, when determining that the current switching resource information does not meet the switching condition, the switching server 701 may perform the exception handling procedure and send the channel switching instruction information for indicating the receiving end 702 to perform a corresponding operation to the receiving end 702. As a result, when failing to provide a normal fast channel switching service, the switching server 701 may send specific channel switching instruction information to the receiving end 702, so as to instruct the receiving end 702 about which kind of corresponding processing to be performed, while may not necessarily directly reject the channel switching request, so as to enable the receiving end 702 to perform a reasonable operation and effectively use available resources of the switching server 701, which therefore improves the channel switching efficiency.

Figure 8:
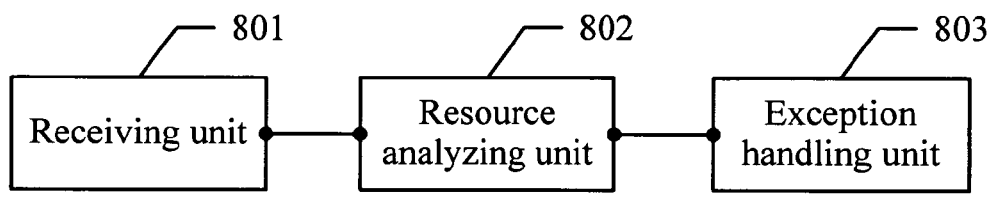
FIG. 8 is a schematic diagram of an embodiment of a switching server according to the present invention.

Referring to FIG. 8, an embodiment of a switching server is provided, which includes a receiving unit 801, a resource analyzing unit 802, and an exception handling unit 803.

The receiving unit 801 is configured to receive a channel switching request sent by a receiving end.

The resource analyzing unit 802 is configured to determine whether current switching resource information meets a switching condition according to the channel switching request.

The exception handling unit 803 is configured to, when the resource analyzing unit 802 determines that the current switching resource information does not meet the switching condition, perform an exception handling procedure and send channel switching instruction information to the receiving end, in which the channel switching instruction information is configured to instruct the receiving end to perform a channel switching operation corresponding to the channel switching instruction information.

Figure 9:
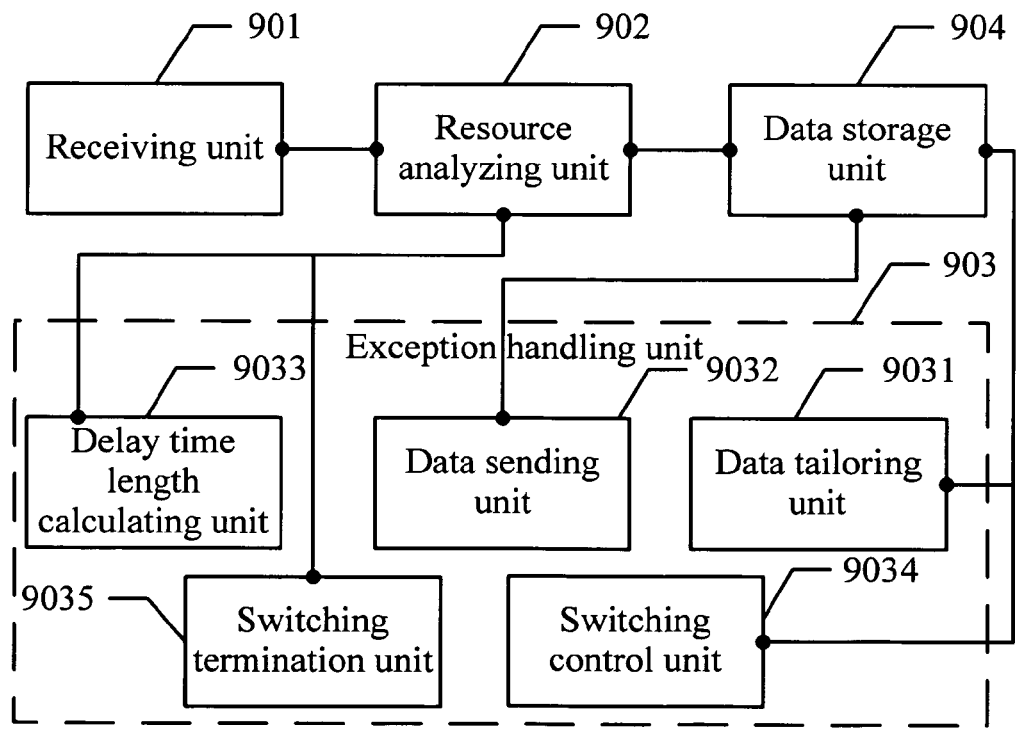
FIG. 9 is a schematic diagram of another embodiment of a switching server according to the present invention.

For a better understanding, the switching server is described with reference to a specific embodiment. Referring to FIG. 9, another embodiment of a switching server is provided, which includes a receiving unit 901, a resource analyzing unit 902, an exception handling unit 903, and a data storage unit 904.

The receiving unit 901 is configured to receive a channel switching request sent by a receiving end.

The resource analyzing unit 902 is configured to determine whether current switching resource information meets a switching condition according to the channel switching request.

The exception handling unit 903 is configured to, when the resource analyzing unit 902 determines that the current switching resource information does not meet the switching condition, perform an exception handling procedure and send channel switching instruction information to the receiving end, in which the channel switching instruction information is configured to instruct the receiving end to perform a channel switching operation corresponding to the channel switching instruction information.

The data storage unit 904 is configured to store a data stream obtained by copying an original multicast stream.

The exception handling unit 903 in this embodiment includes at least one of the following units: a data tailoring unit 9031, a data sending unit 9032, a delay time length calculating unit 9033, a switching control unit 9034, and a switching termination unit 9035.

The data tailoring unit 9031 is configured to tailor the data stream stored in the data storage unit 904 to obtain a tailored data stream, and send the tailored data stream to the receiving end.

The data sending unit 9032 is configured to send the data stream stored in the data storage unit 904 to the receiving end.

The delay time length calculating unit 9033 is configured to calculate a delay time length according to the switching resource information.

The switching control unit 9034 is configured to obtain a moment that a next random access point appears according to the data stream stored in the data storage unit 904, and determine whether a time length between a moment that the channel switching request is received to the moment that the next random access point appears meets a preset condition, and if the time length meets the preset condition, trigger the receiving end to directly join a target multicast group.

The switching termination unit 9035 is configured to stop a channel switching procedure.

In this embodiment, the specific function implemented by each unit included in the exception handling unit 903 is consistent with the five method embodiments described above, and is not described in detail herein again.

In this embodiment, when the resource analyzing unit 902 determines that the current switching resource information does not meet the switching condition, the exception handling unit 903 may perform an exception handling procedure and send the channel switching instruction information for indicating the receiving end to perform a corresponding operation to the receiving end, so as to enable the receiving end to perform a reasonable operation and effectively use available resources of the switching server, which therefore improves the channel switching efficiency.

Figure 10:
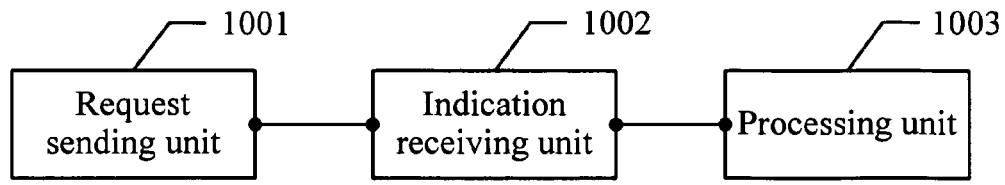
FIG. 10 is a schematic diagram of an embodiment of a receiving end according to the present invention.

Referring to FIG. 10, an embodiment of a receiving end is provided, which includes a request sending unit 1001, an instruction receiving unit 1002, and a processing unit 1003.

The request sending unit 1001 is configured to send a channel switching request to a switching server.

The instruction receiving unit 1002 is configured to receive channel switching instruction information sent by the switching server when the switching server determines that the current switching resource information does not meet a switching condition according to the channel switching request.

The processing unit 1003 is configured to perform a channel switching operation corresponding to the channel switching instruction information according to the channel switching instruction information.

The function performed by the receiving end in this embodiment is consistent with the function performed by the receiving end described in the above method embodiments, and is not described in detail herein again.

In this embodiment, after the instruction receiving unit 1002 receives the channel switching instruction information sent by the switching server, the processing unit 1003 may perform a reasonable operation according to the channel switching instruction information, which therefore improves the channel switching efficiency.

The skilled in the art should understand that all or a part of the steps in the method of the above embodiments may be realized by instructing relative hardware with programs. The programs may be stored in a computer readable storage medium, such as a Read-Only Memory (ROM), a magnetic disk, or an optical disk.

The channel switching processing method, system, and related devices provided in the present invention are introduced in detail as above. The skilled in the art may change the specific implementations and application ranges according to the concept in the embodiments of the present invention. In view of the above, the specification shall not be construed as a limit to the present invention.

What is claimed is:

1. A channel switching processing method, comprising:
Receiving by a switching server, a channel switching request sent by a receiving end; and
Performing by the switching server, an exception handling procedure, when determining that current switching resource information does not meet a switching condition according to the channel switching request, and sending channel switching instruction information to the receiving end, wherein the channel switching instruction information instructs the receiving end to perform a channel switching operation corresponding to the channel switching instruction information;
wherein the performing of the exception handling procedure and the sending of the channel switching instruction information to the receiving end, comprising:
tailoring, by the switching server, a data stream that is not transmitted, and sending the tailored data stream and first channel switching instruction information to the receiving end,
wherein the first channel switching instruction information comprises: first description information and first processing information;
the first description information comprises at least one of: a destination address of the tailored data stream, tailoring information of the tailored data stream, and server exception information; and
the first processing information instructs the receiving end to perform: ignore lost content in the received data stream, cancel data error correction, update playback delay, and enable adaptive playback.

2. The method according to claim 1, wherein the switching resource information comprises at least one of: network bandwidth information, server load information, buffer information of the receiving end, and channel buffer information; and
the switching server determines that current switching resource information does not meet the switching condition if at least one of the following conditions is met:
the switching server determines that available bandwidth is smaller than a preset bandwidth threshold value according to the network bandwidth information;
the switching server determines that a server load is larger than a preset load threshold value according to the server load information;
the switching server determines that a data stream makes a receiving end buffer larger than a preset buffer maximum threshold according to the buffer information of receiving end;
the switching server determines that the data stream makes the receiving end buffer smaller than a preset buffer minimum threshold according to the buffer information of receiving end; and
the switching server determines that the data stream makes a receiving end playback time-shift larger than a preset threshold value according to the channel buffer information,
wherein the data stream is obtained by completely copying an original multicast stream, or is obtained by tailoring the original multicast stream.

3. The method according to claim 2, wherein before the switching server determines whether the current switching resource information meets the switching condition, the method comprising:
transmitting by the switching server, the data stream to the receiving end according to the channel switching request.

4. The method according to claim 2, wherein the performing of the exception handling procedure and the sending of the channel switching instruction information to the receiving end comprising:
calculating by the switching server, a delay time length according to the switching resource information; and
sending by the switching server, second channel switching instruction information to the receiving end, wherein the second channel switching instruction information comprises one or both of second description information and second processing information;
the second description information comprises at least one of: the data stream destination address, the delay time length, and the server exception information; and
the second processing information instructs the receiving end to start a timer to wait for the delay time length, and then to perform one or both of: receive the data stream and update a receiving end state.

5. The method according to claim 2, wherein the performing of the exception handling procedure and the sending of the channel switching instruction information to the receiving end comprising:
obtaining by the switching server, a moment that a next random access point appears according to a data stream; and
determining by the switching server, whether a time length between a moment that the channel switching request is received to the moment that the next random access point appears meets a preset condition, and if the time length meets the preset condition:
sending by the switching server, third channel switching instruction information to the receiving end, wherein the third channel switching instruction information comprises one or both of: third description information and third processing information,
wherein the third description information comprises at least one of: a target multicast group address, a moment that a next random access point appears, server exception information, and description information for indicating the receiving end to immediately join a target multicast group according to the target multicast group address; and
the third processing information instructs the receiving end to immediately join the target multicast group according to the target multicast group address, or join the target multicast group according to the target multicast group address before the moment that the next random access point appears.

6. The method according to claim 2, wherein
when the switching server determining that the data stream causes the receiving end buffer larger than the preset buffer maximum threshold according to the buffer information of receiving end, the performing of the exception handling procedure and the sending of the channel switching instruction information to the receiving end comprising:

transmitting by the switching server, the data stream to the receiving end, and sending fourth channel switching instruction information to the receiving end, wherein the fourth channel switching instruction information comprises one or both of: fourth description information and fourth processing information;

wherein the fourth description information comprises at least one of: a fast playback instruction, a target multicast group address, data stream tailoring information, and server exception information; and the fourth processing information instructs the receiving end to perform one or more of: fast playback according to the fast playback instruction, join the target multicast group according to the target multicast group address, ignore lost content in the data stream, cancel data error correction, and update playback delay;

or, when the switching server determines that the data stream causes the receiving end buffer smaller than the preset buffer minimum threshold according to the buffer information of receiving end, the performing of the exception handling procedure and the sending of the channel switching instruction information to the receiving end comprising:

transmitting by the switching server, the data stream to the receiving end, and sending fourth channel switching instruction information to the receiving end, wherein the fourth channel switching instruction information comprises one or both of: fourth description information and fourth processing information;

wherein the fourth description information comprises at least one of: a slow playback instruction, a target multicast group address, and data stream tailoring information; and the fourth processing information instructs the receiving end to perform one or more of: slow playback according to the slow playback instruction, join the target multicast group according to the target multicast group address, ignore lost content in the data stream, cancel data error correction, and update playback delay.

7. The method according to claim 2, wherein the performing of the exception handling procedure and the sending of the channel switching instruction information to the receiving end comprising:

Stopping by the switching server, a channel switching procedure; and sending by the switching server, fifth channel switching instruction information to the receiving end, wherein the fifth channel switching instruction information comprises one or both of: fifth description information and fifth processing information;

wherein the fifth description information comprises at least one of: a target multicast group address, a moment that a next random access point appears, a suspension time length, and server exception information; and the fifth processing information instructs the receiving end to perform one or more of: immediately join a target multicast group according to the target multicast group address, join the target multicast group according to the target multicast group address before the moment that the next random access point appears, ignore a gap between the data stream and a multicast stream provided by the target multicast group, and initiate a new channel switching request to the switching server again after the suspension time length.

8. The method according to claim 4, wherein after the performing of the exception handling procedure and the sending of the channel switching instruction information to the receiving end, the method further comprising:

transmitting by the switching server, the data stream to the receiving end after waiting for the delay time length;

or, tailoring by the switching server, the data stream after waiting for the delay time length, and sending the tailored data stream to the receiving end.

9. The method according to claim 5, wherein the determining by the switching server, whether the time length from the moment that the channel switching request is received to the moment that the next random access point appears meets the preset condition, comprising determining one or both of:

if the time length from the moment that the channel switching request is received to the moment that the next random access point appears is larger than a first preset value, and smaller than a second preset value, it is then determined that the preset condition is met.

10. The method according to claim 1, wherein the tailoring of the data stream comprising one or more of:

reducing, transcoding, and deleting the data stream.

11. The method according to claim 10, wherein the data obtained by tailoring the data stream comprises one or both of: key information and a reference frame in the data stream; and the key information is required for the receiving end to process data, and comprises one or more of: channel program dedicated information, video sequence parameter set information, video image parameter set information, audio decoding parameter information, and program specific information in a transport stream.

12. A channel switching processing method, comprising:

sending by a receiving end, a channel switching request to a switching server;

receiving by the receiving end, channel switching instruction information sent by the switching server when the switching server determines that current switching resource information does not meet a switching condition according to the channel switching request, wherein an exception handling procedure has been performed by the switching server; and performing by the receiving end, a channel switching operation corresponding to the channel switching instruction information according to the received channel switching instruction information;

wherein the performing of the exception handling procedure and the sending of the channel switching instruction information to the receiving end, comprising:

tailoring, by the switching server, a data stream that is not transmitted, and sending the tailored data stream and first channel switching instruction information to the receiving end, wherein the first channel switching instruction information comprises: first description information and first processing information;

the first description information comprises at least one of: a destination address of the tailored data stream, tailoring information of the tailored data stream, and server exception information; and the first processing information instructs the receiving end to perform: ignore lost content in the received data stream, cancel data error correction, update playback delay, and enable adaptive playback.

13. A channel switching processing system, comprising:
a switching server and a receiving end; wherein
the switching server receives a channel switching request sent by the receiving end, and when determining that current switching resource information does not meet a switching condition according to the channel switching request, performs an exception handling procedure and sends channel switching instruction information to the receiving end; and
the receiving end sends the channel switching request to the switching server, receives the channel switching instruction information sent by the switching server, and performs a channel switching operation corresponding to the channel switching instruction information according to the channel switching instruction information;
wherein the performing of the exception handling procedure and the sending of the channel switching instruction information to the receiving end, comprising:
tailoring, by the switching server, a data stream that is not transmitted, and sending the tailored data stream and first channel switching instruction information to the receiving end,
wherein the first channel switching instruction information comprises: first description information and first processing information;
the first description information comprises at least one of: a destination address of the tailored data stream, tailoring information of the tailored data stream, and server exception information; and
the first processing information instructs the receiving end to perform: ignore lost content in the received data stream, cancel data error correction, update playback delay, and enable adaptive playback.

14. A switching server, comprising:
a receiving unit, which receives a channel switching request sent by a receiving end;
a resource analyzing unit, which determines whether current switching resource information meets a switching condition according to the channel switching request; and
an exception handling unit, when the resource analyzing unit determines that current switching resource information does not meet the switching condition, performs an exception handling procedure, and sends channel switching instruction information to the receiving end, wherein the channel switching instruction information instructs the receiving end to perform a channel switching operation corresponding to the channel switching instruction information;
wherein the performing of the exception handling procedure and the sending of the channel switching instruction information to the receiving end, comprising:
tailoring, by the switching server, a data stream that is not transmitted, and sending the tailored data stream and first channel switching instruction information to the receiving end,
wherein the first channel switching instruction information comprises: first description information and first processing information;
the first description information comprises at least one of: a destination address of the tailored data stream, tailoring information of the tailored data stream, and server exception information; and
the first processing information instructs the receiving end to perform: ignore lost content in the received data stream, cancel data error correction, update playback delay, and enable adaptive playback.

15. The switching server according to claim 14, wherein the switching server further comprises:
a data storage unit, which stores a data stream obtained by copying an original multicast stream.

16. The switching server according to claim 15, wherein the exception handling unit comprises at least one of the following units:
a data tailoring unit, which tailors the data stream stored in the data storage unit to obtain a tailored data stream, and sends the tailored data stream to the receiving end;
a data sending unit, which sends the data stream stored in the data storage unit to the receiving end;
a delay time length calculating unit, which calculates a delay time length according to the switching resource information;
a switching control unit, which obtains a moment that a next random access point appears according to the data stream stored in the data storage unit, and determines whether a time length between a moment that the channel switching request is received to the moment that the next random access point appears meets a preset condition, and if the time length meets the preset condition, trigger the receiving end to directly join a target multicast group; and
a switching termination unit, which stops a channel switching procedure.

17. A receiving end, comprising:
a request sending unit, which sends a channel switching request to a switching server;
an instruction receiving unit, which receives channel switching instruction information sent by the switching server when the switching server determines that current switching resource information does not meet a switching condition according to the channel switching request, wherein an exception handling procedure has been performed by the switching server; and
a processing unit, which performs a channel switching operation corresponding to the received channel switching instruction information according to the channel switching instruction information;
wherein the performing of the exception handling procedure and the sending of the channel switching instruction information to the receiving end, comprising:
tailoring, by the switching server, a data stream that is not transmitted, and sending the tailored data stream and first channel switching instruction information to the receiving end,
wherein the first channel switching instruction information comprises: first description information and first processing information;
the first description information comprises at least one of: a destination address of the tailored data stream, tailoring information of the tailored data stream, and server exception information; and
the first processing information instructs the receiving end to perform: ignore lost content in the received data stream, cancel data error correction, update playback delay, and enable adaptive playback.

18. A channel switching processing method, comprising:
Sending by a receiving end, a channel switching request to a switching server;
Receiving by the receiving end, channel switching instruction information sent by the switching server in response to the channel switching request and tailored data from a data stream sent by the switching server, wherein an exception handling procedure has been performed by the switching server; and Identifying by the receiving end, the tailored data, and performing an operation corresponding to the channel switching instruction information according to the channel switching instruction information;

wherein the performing of the exception handling procedure and the sending of the channel switching instruction information to the receiving end, comprising:

tailoring, by the switching server, a data stream that is not transmitted, and sending the tailored data stream and first channel switching instruction information to the receiving end, wherein the first channel switching instruction information comprises: first description information and first processing information;

the first description information comprises at least one of: a destination address of the tailored data stream, tailoring information of the tailored data stream, and server exception information; and the first processing information instructs the receiving end to perform: ignore lost content in the received data stream, cancel data error correction, update playback delay, and enable adaptive playback.

19. The method according to claim 18, wherein the tailored data comprises one or more of:

key information or a reference frame obtained by reducing the data stream, recoded data obtained by transcoding the data stream, and necessary data obtained by deleting the data stream.

20. The method according to claim 18, wherein the channel switching instruction information comprises description information and processing information;

the description information comprises one or both of: information for identifying the sent data stream as the tailored data, and a feature of the sent tailored data; and the first processing information comprises: information for indicating the receiving end to ignore lost data of the tailored data stream, cancel data error correction, update playback delay, enable adaptive playback, and join a multicast group.

21. The method according to claim 19, wherein the key information comprises one or more of: channel program dedicated information, video sequence parameter set information, video image parameter set information, audio decoding parameter information, and program specific information in a transport stream.

22. The method according to claim 20, wherein the performing the operation corresponding to the channel switching instruction information comprises:

ignoring the lost data of the tailored data stream, cancelling the data error correction, updating the playback delay, enabling the adaptive play, and joining the multicast group according to the channel switching instruction information.

* * * * *